(12) United States Patent
Terakura et al.

(10) Patent No.: US 6,625,605 B1
(45) Date of Patent: Sep. 23, 2003

(54) SERVICE ATTRIBUTE MANAGEMENT SYSTEM

(75) Inventors: Yosuke Terakura, Tokyo (JP); Hiroshi Nagai, Tokyo (JP); Kei Kato, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/576,803

(22) Filed: May 23, 2000

(30) Foreign Application Priority Data

May 24, 1999 (JP) .......................................... 11-143101

(51) Int. Cl.[7] ............................................... G06F 17/30
(52) U.S. Cl. ......................................... 707/10; 709/201
(58) Field of Search ............................ 707/10; 709/315, 709/217, 201

(56) References Cited

U.S. PATENT DOCUMENTS 5,659,683 A  *  8/1997  Kawano et al. ............... 707/10
6,144,661 A  *  11/2000  Katsube et al. ............. 370/390
6,272,500 B1  *  8/2001  Sugita .................... 707/103 R
6,366,913 B1  *  4/2002  Fitler et al. .................... 707/9
6,366,954 B1  *  4/2002  Traversat et al. ........... 709/220
6,377,948 B2  *  4/2002  Kikuchi et al. ................ 707/10

\* cited by examiner

*Primary Examiner*—Greta Robinson
(74) *Attorney, Agent, or Firm*—Rabin & Berdo, P.C.

(57) ABSTRACT

A service attribute management system is provided which is capable of automatically associating an appropriate attribute with a distributed object service without much labor and of providing consistency in attributes to be set. In the service attribute management system, attributes of distributed object services are stored in the service directory as management information, where attributes and its values are decided by an attribute setting section in accordance with some predefined rules.

6 Claims, 8 Drawing Sheets

SERVICE ATTRIBUTE MANAGEMENT SYSTEM

BACKGROUND OF THE INVENTION

1. Field of the Invention

The present invention relates to a management technology of attributes of services provided by a distributed processing system.

2. Description of the Related Art

FIG. 2 is a schematic diagram showing basic configurations of a distributed object system. A conventional distributed object system is generally comprised of a service section 1 implemented as a distributed object, a service directory 2 used to save a list of services in a distributed object environment and a client 3. The service section 1 providing services as a distributed object has a service interface 1A. The service interface 1A is an interface used when the client 3 utilizes services provided by the service section 1.

The service directory 2 stores a real address 2A of the service interface 1A for services provided in the distributed object environment and an attribute 2B providing information about the service. For example, the attribute 2B has fields that hold names of a section, building, floor or room where the service is provided.

Moreover, the service directory is a distributed object service itself with its service interface 2C providing services such as service registration, service deletion, and service retrieval. The service directory 2 can retrieve the real address for the service interface 1A by using information about the attribute associated with services as a search criteria.

Generally, the service section 1 will register a real address 2A of its service interface 1A, with some associated attributes, to the service directory 2, so that the client 3 can retrieve the real address 2A.

For detection of the service directory 2, a multicast function of a network is used. A service directory retrieving message (FIG. 2(1)) to detect the service directory 2 is sent out by using the multicast function.

On the other hand, the service directory 2 that has detected the required service directory retrieving message will return a service directory retrieving reply message to the section which has issued the service directory retrieving message (FIG. 2(2)). The service directory retrieving reply message contains the real address of the service interface 2C connected to the service directory 2.

Then, the section having received the service directory retrieving reply message can access the service interface 2C of the service directory 2 using the real address contained in the message, and can register, delete or retrieve the service of the service section 1. For example, the service section 1 registers the real address and attributes of the service interface 1A in the service directory 2(FIG. 2(3)).

The client 3, when using a specific service, first detects the service directory 2 running in the distributed object environment (FIG. 2(4)(5)) in the same way described above, and then accesses the service interface 2C of the service directory 2 (FIG.2 (6)) to retrieve the real address of the service interface 1A of the targeted service section 1. After that, the client, by using the real address of the service interface 1A, utilizes the target service 1 (FIG. 2(7)).

In a distributed object environment where real addresses of service interfaces are obtained via the service directory, the attributes of every service registered in the service directory 2 play an important role in an exact and successful retrieval of real addresses.

For example, in a corporate network, the name of a department or a section or an office can be associated with a service as attributes. At this point, a client 3 that is willing to utilize a service can, by designating types of services (i.e., type of the service interface) and attributes that contain the department and/or section and/or office name to the service directory 2, obtain the real address of the service interface 1A that is provided at a desired department or section or an office.

It is either the responsibility of the service section registering the real address of its service interface 1A or a third party, to set the attribute 2B to the service. The third party includes, for example, a system manager.

However, if the service section itself is to register the attribute, problems arise in that there can be potentially multiple attribute values representing the same entity. For example, "Marketing Department" and "Marketing Dept." and "Marketing" for a single Marketing Department. It is impossible to ensure consistency in attributes among services, since attributes may be assigned by different individuals or organizations.

On the other hand, though the method in which the third party is to set the attribute to every service is effective in maintaining consistency in attributes, enormous labor is required for setting attributes to every service as the number of services increases. Another problem is that, whenever a new service is registered, an attribute suitable to the new service must be set causing a great burden to the system manager.

SUMMARY OF THE INVENTION

In view of the above, it is an object of the present invention to provide a service attribute management system, which is capable of automatically setting attributes of a distributed object services and of providing consistency in attributes that are set.

According to an aspect of the present invention, a service attribute management system is provided for storing at least one attribute of a distributed object service in a service directory as management information, comprising an attribute setting section used to decide attributes to be registered in said service directory, where the attributes are decided in accordance with setting conditions and information on the service section.

In the foregoing, a preferable mode is one wherein setting conditions referenced by the attribute setting section are able to be arbitrarily set.

Also, a preferable mode is one wherein the service directory is mounted for every network interface.

Also, a preferable mode is one wherein the attribute setting section is mounted so as to be associated with the service directory provided for every network interface and wherein the setting condition is able to be set individually.

Also, a preferable mode is one wherein the attribute setting section is mounted so as to be commonly used for the service directory provided for every network interface and wherein a registration of an attribute in the service directory is performed individually in accordance with setting conditions corresponding to the service directory stored in a corresponding relationship table.

Also, a preferable mode is one wherein the attribute decided by the attribute setting section is registered by the attribute setting section in the corresponding service directory.

Also, a preferable mode is one wherein the attribute setting section, upon deciding attributes to be associated with the service section, notifies the service section of the attributes so that the service section can register the attributes in the service directory by itself.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
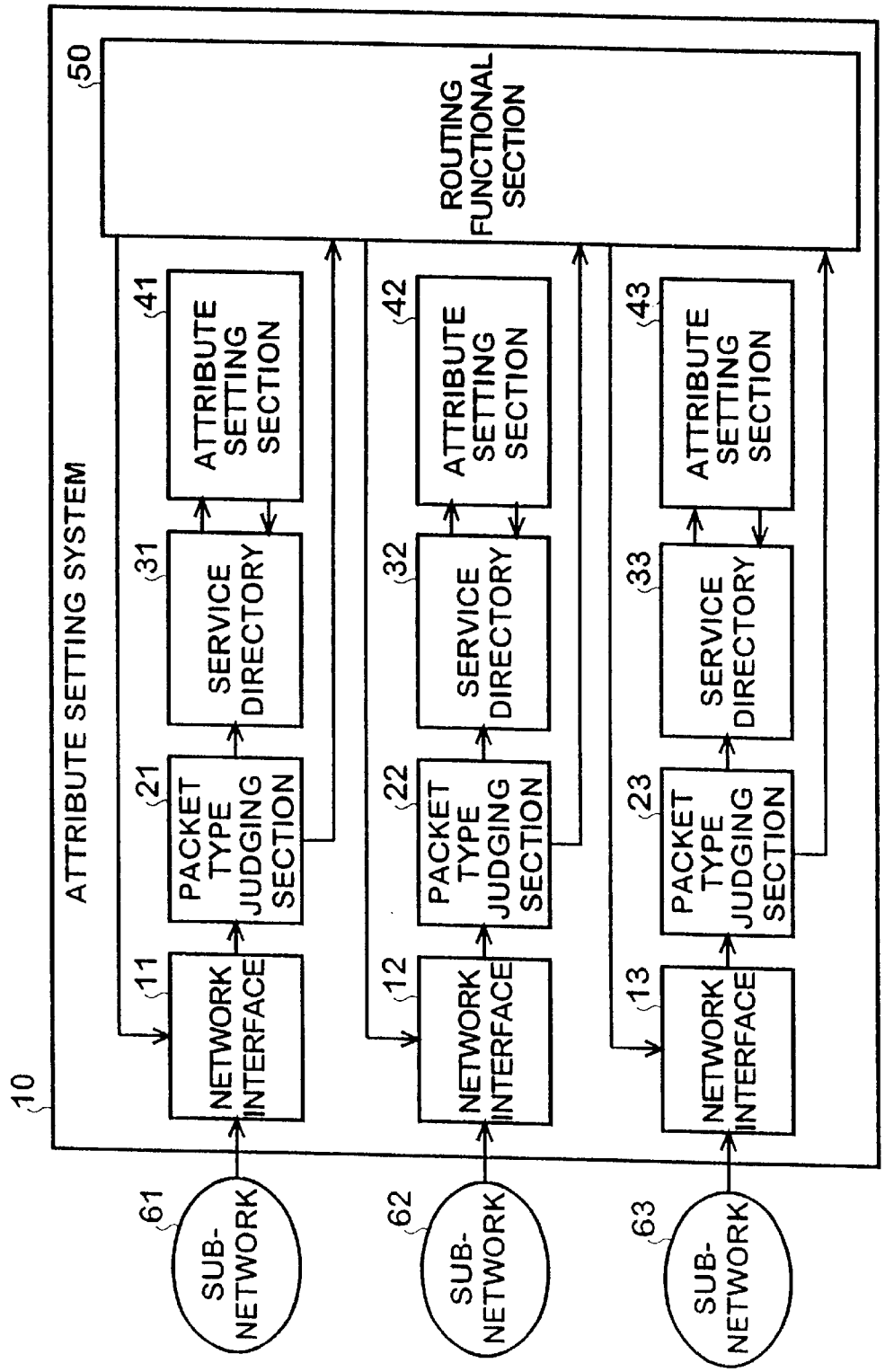
FIG. 1 is a schematic block diagram of a distributed object system provided with a service attribute management system according to the first embodiment of the present invention.

FIG. 1 is a schematic block diagram of a distributed object system provided with a service attribute management system according to a first embodiment of the present invention. Configurations shown in FIG. 1 do not give any limitation to hardware or software configurations of the implementation of the present invention.

Referring to FIG. 1, the service attribute management system of the first embodiment is represented as attribute setting system 10. The attribute setting system 10 is comprised of a network interfaces 11, 12, and 13, packet type judging sections 22, 22, and 23, service directories 31, 32, and 33, attribute setting sections 41, 42, and 43, and a routing functional section 50.

In FIG. 1, only three network interfaces (11 to 13), three packet type judging sections (21 to 23), three service directories (31 to 33) and three attribute setting sections are shown, however, it is needless to say that these are merely examples and an arbitrary number of these components may be incorporated depending on the system to be applied.

Each of the network interfaces 11 to 13 has its own network address and sends and receives messages from and to a sub-network 61 to 63 that it is connected to. The message that has been received by the network interface 11, for example, is fed to the packet type judging section 21. The packet type judging section 21 transfers the message fed from the corresponding network interface 11 to the routing functional section 50, unless the message's destination is the corresponding network interface 11. Then, the packet type judging section 21 also judges whether the message is a service directory retrieving message.

If the message is addressed to the corresponding network interface 61 or the message is a service directory retrieving message, the packet type judging section 21 notifies the service directory 31 of the message. If the message is addressed to the corresponding network interface 11, then the message is not transferred to the routing functional section 50.

Figure 2:
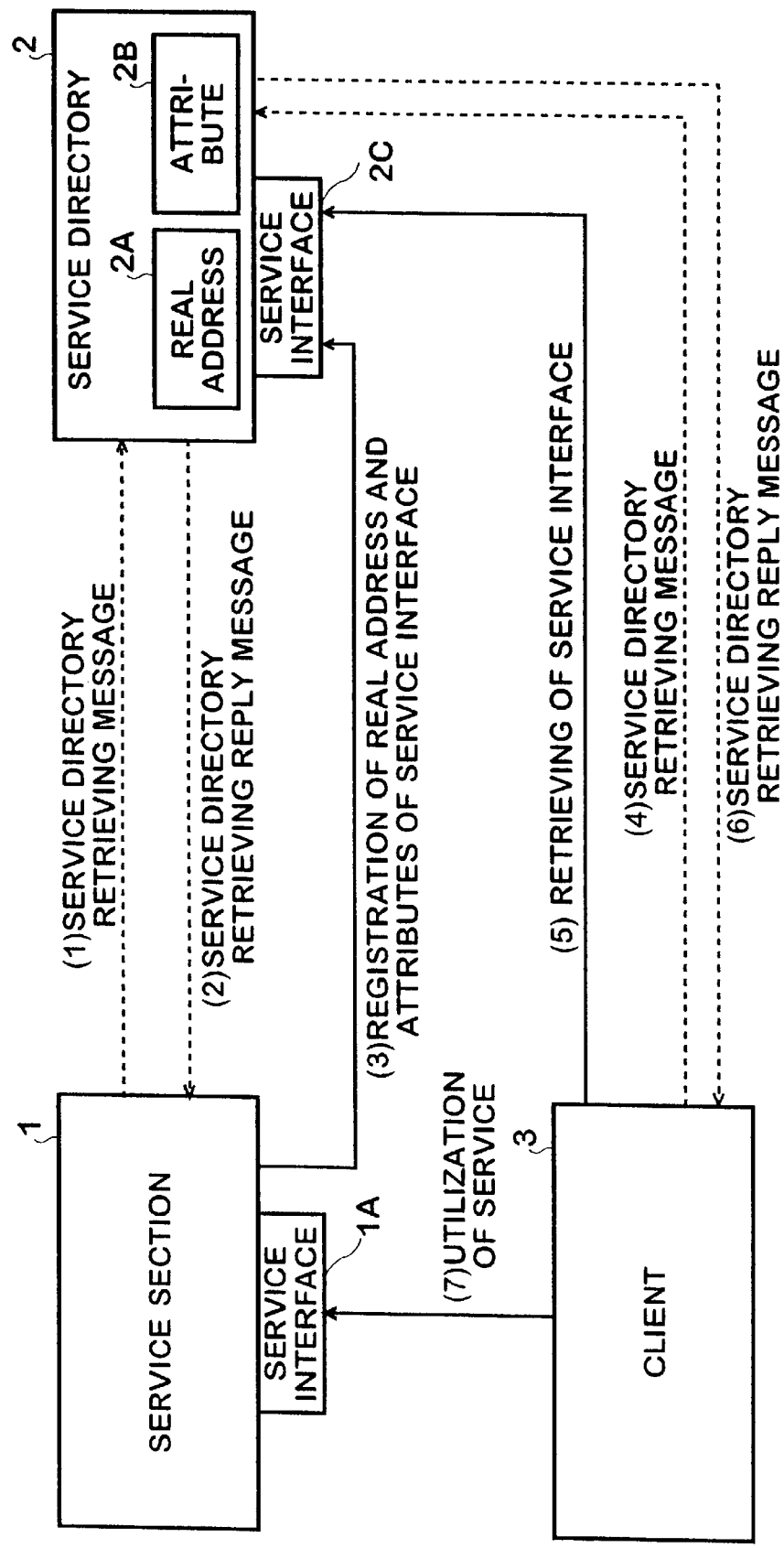
FIG. 2 is a schematic block diagram showing basic configurations of a distributed object system.

The service directory 31 is a functional section used to notify the service section of the real address of the service interface (not shown in FIG. 1, but corresponding to the service interface 2C for the service directory 2 shown in FIG. 2) at the service directory 31. That is, the service directory 31, when receiving the service directory retrieving message from the packet type judging section 21, creates a service directory retrieving reply message and sends it to the network interface 11. At this point, the real address of the service interface at the service directory 31 is encapsulated in the reply message.

The service directory 31, when the service is registered by a service registration requiring message received through the service interface, sends a notification that includes the contents of the registration to the attribute setting section 41 to inform it with the new service registration.

The attribute setting section 41 is a functional section to decide an attribute to be associated with the service registered at the service directory 31. The attribute to be set will be decided in accordance with pre-defined conditions. The conditions may include, for example, location (network address) of a node that hosts the service, service's type (the type of the service interface), and so on. The attributes to be associated with the service may include information such as names of a department or section, building, floor or room.

The routing functional section 50 is a router which, based on a routing table, plays a role in transferring a message fed from the network interface 11 to an appropriate sub-network through the appropriate network interface.

Next, how the attribute setting system of this embodiment associates attributes with a distributed object service will be described. Operations of attribute management contain two phases, which are activation phase and operation phase. Each phase will be described below.

First, in the activation phase, the attribute setting system of this embodiment will be setup, followed by some initial configuration. During the activation phase, the network address for the network interface 11 (for example) is set and service directory 31 is instantiated. Upon instantiation, the service directory 31 obtains a real address of the service interface of the service directory 31 based on the network address of the network interface 11.

The attribute setting section 41 is used to set attributes of various services that will be registered in the future. The rules for setting the attributes are configured by reading that have been registered in advance by a system manager or by querying the system manager.

Also, at this phase, the routing functional section 50 sets up its routing table.

The operation phase is a phase during which the attribute of a service is actually registered by the attribute setting system 10. During this operation phase, two sub-phases, a service activation sub-phase and an attribute setting sub-phase, are executed repeatedly (or in parallel).

Figure 3:
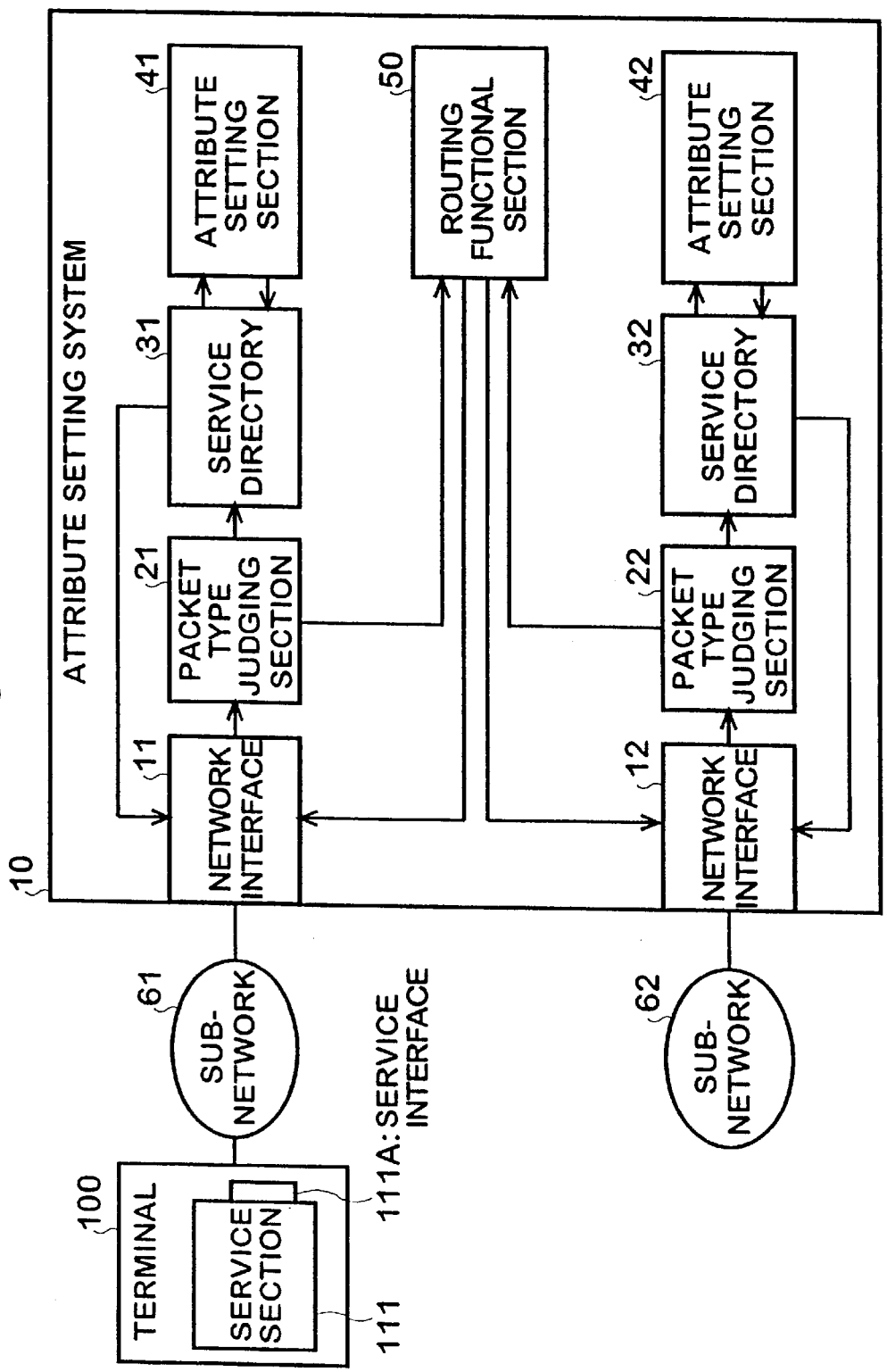
FIG. 3 is a schematic block diagram of the service attribute management system of the first embodiment, which is used for description of its operations.
Figure 4:
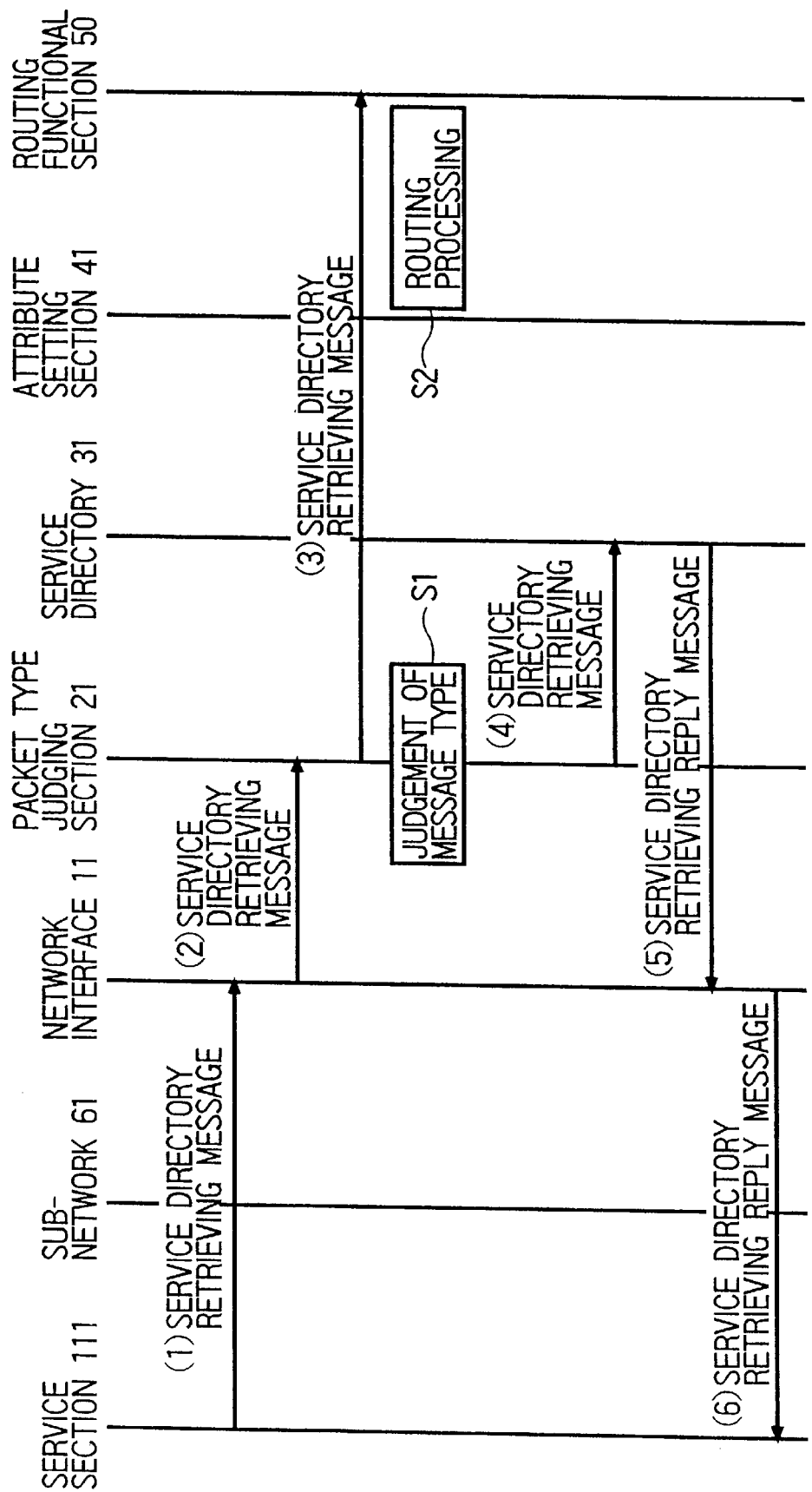
FIG. 4 shows a flowchart explaining operations during a service activation sub-phase.
Figure 5:
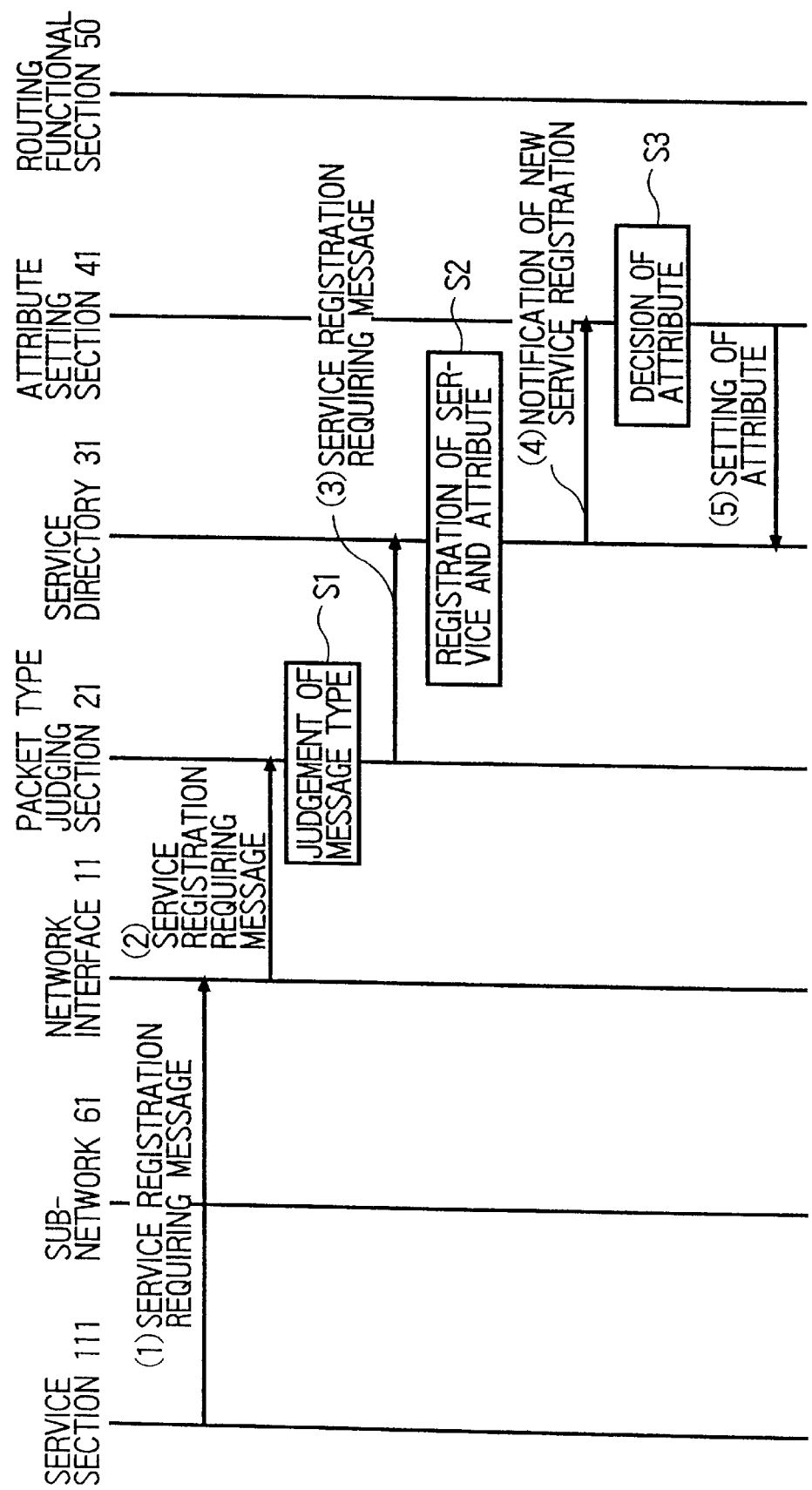
FIG. 5 shows a flowchart explaining operations during an attribute setting sub-phase.

FIGS. 3 to 5 shows the operations for registering service attributes that are performed by the attribute setting system 10 during the operation phase. To simplify the description, FIG. 3 shows a case in which the attribute setting system 10 is comprised of only two network interfaces, packet type judging sections, service directories and attribute setting sections.

In FIG. 3, terminal 100 is where the implementation of the service section 111 resides. The terminal 100 is connected to the attribute setting system 10 by a sub-network 61. FIG. 4 shows a flowchart explaining operations during the service activation sub-phase and FIG. 5 shows a flowchart explaining operations during the attribute setting sub-phase.

Operations during the service activation sub-phase will be described below. During this phase, the service section 111 is activated on the terminal 100 connected to the sub-network 61. The service section 111, when activated, sends a service directory retrieving message to the sub-network 61 by using a multicast function on the network in order to detect any service directory in which the service section 111 is to be registered (FIG. 4(1)).

The network interface 11 then receives the service directory retrieving message and forwards the message to the corresponding packet type judging section 21 (FIG. 4(2)).

The packet type judging section 21 transfers the service directory retrieving message to the routing functional section 50 (FIG. 4(3)) and judges whether the destination of the message is a network address of the network interface 11 or whether if the message is a service directory retrieving message (Step S1 in FIG. 4). If the destination of the message is either the network address of the network interface or the message is a service directory retrieving message, the packet type judging section 21 transfers contents of the message to the service directory 31 (FIG. 4 (4)).

In the above description, the message is a service directory retrieving message. Therefore, the service directory 31 creates a service directory retrieving reply message containing a real address of the service interface 111A.

A sender of the service directory retrieving message is set as the destination of the reply message. The reply message is fed to the network interface 11 (FIG. 4(5)). The network interface 11 sends the reply message out to the service section 111 (FIG. 4(6)) through the sub-network 61.

Next, operations during the attribute setting sub-phase are described. During the attribute setting sub-phase, the service section 111 receives the service directory retrieving reply message and obtains the real address of the service interface of the service directory 31.

The service section 111, when obtaining the real address, calls a registering operation on the service interface 111A and registers the real address of the service interface 111A to the service directory 31. At this point, attributes related to the service section 111 will also be associated with the service.

This registering operation stated above is initiated by the service section, which sends the service registration requiring message (FIG. 5(1)(2)). This message is fed to the packet type judging section 21 and its type is judged (Step S1 in FIG. 5).

The service directory 31, when receiving the service registration requiring message (FIG. 5(3)), registers the new service contained in the message (Step S2 in FIG. 5) and simultaneously notifies the corresponding attribute setting section 41 of the information about the service (for example, real addresses and attributes of the service interface 111A) (FIG. 5(4)).

The attribute setting section 41, when receiving the notification of new service registration, decides an attribute and its value of the service section 111 based on some predefined rules and the information received form the service directory 31. The attribute setting section 41 then associates the attribute with the service (Step S3 and (5) in FIG. 5).

Due to the fact that attrribute and its values are determined by the attribute setting section 41 according to some predefined rules, the attributes and its values will be consistent among services. Also, since the attributes will be associated with services automatically, the workload of the system manager will be dramatically reduced.

Moreover, by separately setting each of the service directories (e.g., 31–33) and of attribute setting sections (e.g., 41–43) for every network interface (e.g., 11–13), the setting condition set at the attribute section (e.g., 41–43) can be independent on each other and the attribute to be associated with a service can be managed individually for every network interface (e.g., 11–13).

Second Embodiment

Figure 6:
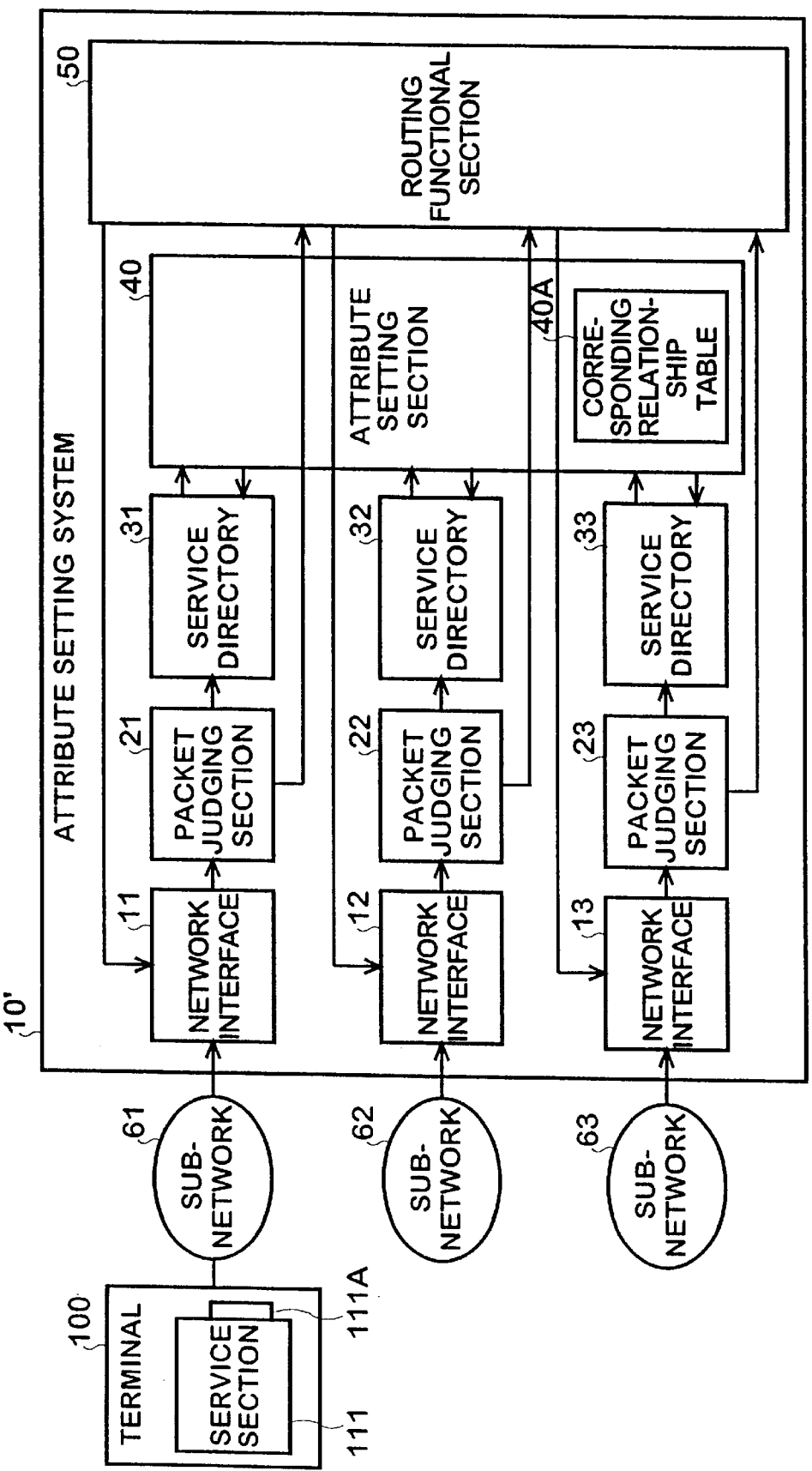
FIG. 6 is a schematic block diagram of a distributed object system provided with a service attribute management system according to a second embodiment of the present invention.

FIG. 6 is a schematic block diagram of a distributed object system provided with a service attribute management system according to the second embodiment of the present invention. Configurations shown in FIG. 6 do not give any limitation to hardware or software configurations of the implementation of the present invention. The only difference between the first embodiment and second embodiment in terms of configuration, is the configuration of the attribute setting section 40. That is, in the first embodiment, an exclusive attribute setting section (e.g., 41–43) is mounted to each of the network interfaces (e.g., 11–13); however, in the second embodiment, only one attribute setting section 40 is provided for two or more network interfaces 1m (e.g., 11–13).

According to the second embodiment, the attribute setting section 40 is provided internally with a corresponding relationship table 40A. The corresponding relationship table 40 is a table in which a setting condition for every service directory (e.g., 31–33) is stored. The attribute setting section 40, by using an identifier (used for identifying the service directory) contained in a new service registering notification fed from the service directory, as a search key, reads corresponding setting conditions and decides attributes to be associated with the service.

Next, operations of the attribute setting section 10' for setting attributes will be described. The operations in the second embodiment are the same as those in the first embodiment except for operations in the attribute setting sub-phase. Therefore, only the operations in the attribute setting sub-phase are described below.

In the attribute setting sub-phase, operations are activated when the service section 111 receives a service directory retrieving replying message and obtains a real address of the service interface of the service directory 31.

The service section 111, after having obtained the real address of the service interface of the service directory 31, calls a registration operation on the service interface to register the real address of its service interface 111A. At this point, attributes related to the service provided by the section service 111 will also be associated with the service.

In the above scenario, the registering operation is called by sending the service registration requiring message. This message is fed to the packet type judging section 21 and the type is then judged.

The service directory 31, when receiving the service registration requiring message from the packet type judging section, registers the new service contained in the message and at the same time notifies the attribute setting section 40 of information about the new service (for example, the real address of the service interface 11A) and the identifier of the service directory 31. It is specific to this embodiment that the identifier of the service directory is contained in this notification.

The attribute setting section 40, when receiving the notification of the new service registration, retrieves the corresponding table 40A and reads setting conditions (rules) stored in the table 40A; corresponding to the identifier of the service directory contained in the received notification. After that, the attribute setting section 40 decides, based on the setting conditions (rules) described above, an attribute to be actually associated with the service out of information provided from the service section 111. In the above description, the setting conditions (rules) are statically stored in the corresponding relation table 40A. On the other hand, the attribute can be dynamically decided by calling a sub-routine, where reference to the subroutine is stored in the corresponding relation table 40A.

Then, the attribute setting section 40 performs an operation to associate the decided attribute with the service registered in the service directory 31. Thus, according to this embodiment, since items to be set as attributes of services are in advance set to the corresponding relation table 40A of the attribute setting section 40, the registration of attributes with consistency is made possible.

Since, in the second embodiment, only processing technique during the attribute setting sub-phase is different from that in the first embodiment, and contents of the registration obtained as a result of the processing in the second embodiment are the same as those in the first embodiment, the same effects in the first embodiment can be obtained in the second embodiment.

Third Embodiment

Figure 7:
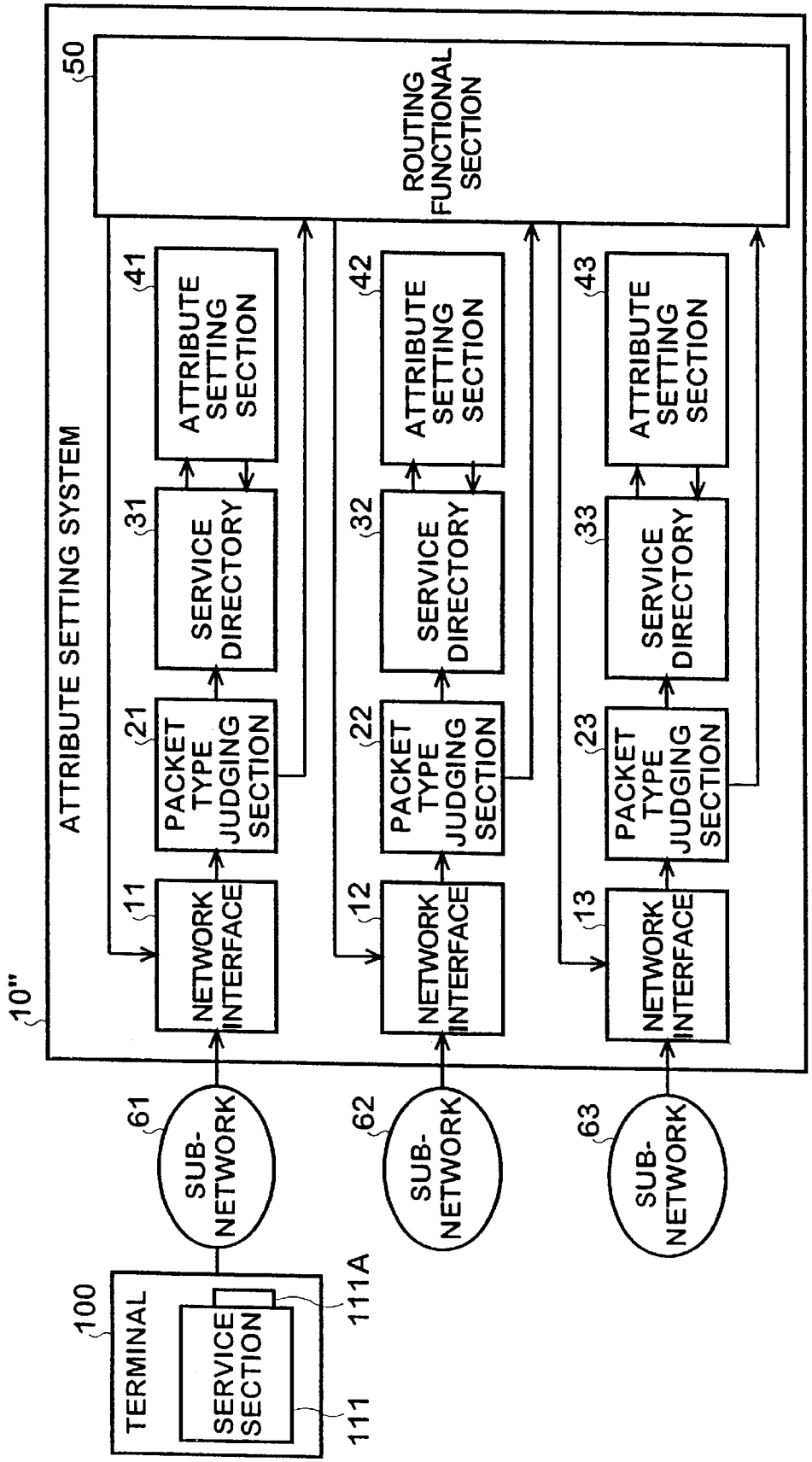
FIG. 7 is a schematic block diagram of a distributed object system provided with a service attribute management system according to a third embodiment of the present invention.

FIG. 7 is a schematic block diagram of a distributed object system provided with a service attribute management system according to a third embodiment of the present invention. Configurations shown in FIG. 7 do not give any limitation to hardware or software configurations of the implementation of the present invention.

Configurations in the first embodiment differ from those in the second embodiment in that the attribute decided by the attribute setting section 41 (for example) is not registered to the service directory 31 by the attribute setting section 41, but by the service section 111. In other words, the attribute setting section 41 sends a set of attributes to the service section 111 and request the service section 111 to associate itself with the set of attributes.

Figure 8:
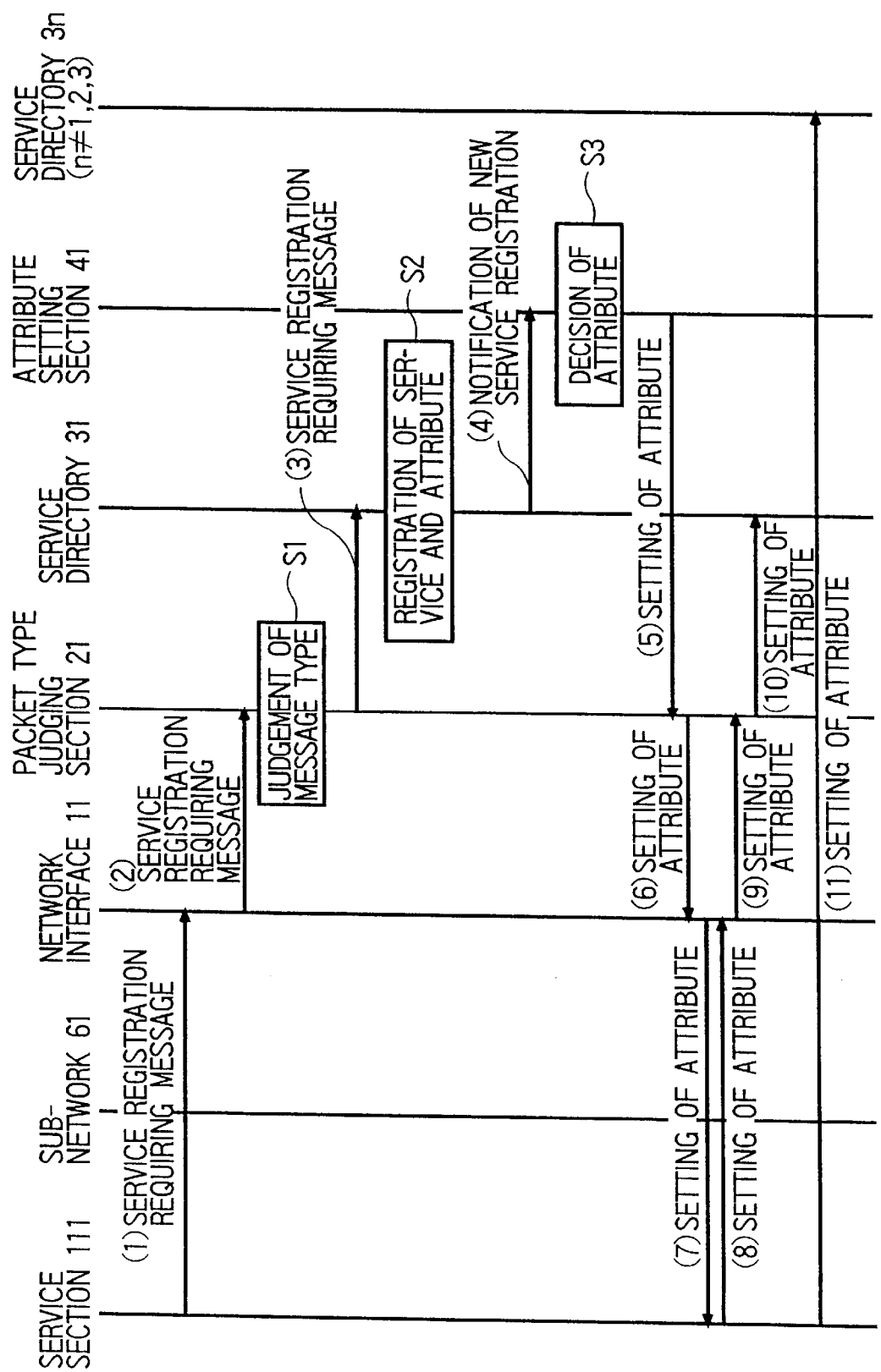
FIG. 8 shows a flowchart explaining operations during the attribute setting sub-phase executed in the service attribute management system according to the third embodiment.

Next, operations of the attribute setting section 10" for setting attributes will be described. The operations in the third embodiment are the same as those in the first embodiment except operations in the attribute setting sub-phase. Therefore, only the operations in the attribute setting sub-phase are described below. FIG. 8 shows a flowchart explaining operations during the attribute setting sub-phase executed in the service attribute management system according to the third embodiment.

According to the embodiment, the sub-phase operation is started when the service section 111 have received the service directory retrieving replying message and have acquired real addresses of the service interface of the service directory 31.

The service section 111, when obtaining the real address, calls a registering operation on the service interface 111A and registers the real address of the service interface 111A to the service directory 31. At this point, attributes related to the service section 111 will also be associated with the service.

This registering operation is initiated by sending the service registration requiring message (FIG. 8(1)(2)). This message is fed to the packet type judging section 21 and its type is judged (Step S1 in FIG. 8).

The service directory 31, when receiving the service registration requiring message (FIG. 8(3)) from the packet type judging section 21, registers the new service contained in this message (Step S2 in FIG. 8) and simultaneously notifies the corresponding attribute setting section 41 of the information about the service (for example, real address of the service interface 111A)(FIG. 8(4)).

The attribute setting section 41, when receiving the notification of new service registration, selects and decides an attribute and its value to be associated with the service section 111 out of the received information. Operations described above are the same as those in the first embodiment.

When the attribute to be associated is decided, the attribute setting section 41 notifies the service section 111 of the decided attribute by using an, attribute setting function of the service interface 111A ((5)(6)(7) in FIG. 8). However, this operation is performed on the precondition that the service interface 111A is configured so as to support the function to set the attribute.

The service section 111, when receiving a notification of so decided attributes, registers the attribute provided by the notification in the service directory 3m in which the service section is registered ((8)(9)(10) in FIG. 8). In the example in FIG. 8, the service section 111 registers the attribute in the service directory 31.

Moreover, if the service section 111 is registered in another service directory (not service directory 31, 32, or 33 in FIG.8), the service section 111 registers the decided attribute in the service directory (e.g., 31). However, it is presumed that the service directory 31 is being operated on a network independently regardless of the attribute setting system 10".

Since, in the third embodiment, only processing technique during the attribute setting sub-phase is different from that in the first embodiment and contents of the registration obtained as a result of processing in the third embodiment are the same as those in the first embodiment, the same effects in the first embodiment can be obtained in the third embodiment.

Furthermore, in the first and second embodiment, the attribute set to the service directory 31 (for example) is directly controlled by the attribute setting section 41;, however, in the third embodiment, the information about the attribute to be registered is fed to the service section 111, and the attribute is registered in the service directory 41 by the service section 111 itself. This gives the service section 111 a chance to register the attributes with other service directories that the service section 111 is also registered with, thus assuring the consistency of the attributes of services between service directories even when a specified service is registered in a plurality of service directories.

It is apparent that the present invention is not limited to the above embodiments but may be changed and modified without departing from the scope and spirit of the invention. For example, in the embodiments described above, the attribute setting systems 10, 10' and 10" having the routing functional section 50 (i.e., the router) are described, however, the present invention is not limited to the router and a layer switch 3, a gateway or a like may be used as well. If such a switch as above is applied, the routing functional section 50 in this embodiment is replaced with a switching functional section.

In the above embodiments, though the case is described where the service section 111 registers a real address of the service interface in the corresponding service directory (for example, the service directory 31), the present invention can be applied to a case where a proxy that implements the service interface is registered in the service directory. In the present application, the term "real address" can be substituted with "proxy".

Also, in the embodiments described above, the network interface (e.g., 11) and the service directory (e.g., 31) are mounted in a one-to-one relationship, however, only one service directory may be mounted to two or more network interfaces. In this case, since items of attributes to be stored by the attribute setting section in the service directory can be unified, it is possible to assure the consistency of service attributes to be stored.

Also, in the above embodiments, though the system is so configured that the packet type judging section (e.g., 21) transfers the message to the routing functional section 50, it may be so configured that the network interface 1m directly transfers the received message to the routing functional section 50.

Furthermore, it should be noted that, in the above embodiments, the packet type judging section (e.g., 21), service directory (e.g., 31), attribute setting section (e.g., 41), routing functional section 50 are separately provided as logical functional blocks for description purpose, however, it does not define or limit actual hardware or software configurations in terms of their packaging or implementation.

What is claimed is:

1. A service attribute management system for use in a distributed object system having a service section, comprising:

a service directory for storing an attribute of the service section as management information; and an attribute setting section used to determine the attribute that is to be stored in said service directory, the attribute that is to be stored being determined by the attribute setting section in accordance with predetermined setting conditions and information about said service section, wherein the distributed object system includes a network having a plurality of sub-networks, and further comprising a plurality of network interfaces, each network interface being connected to a corresponding one of the sub-networks; and at least one additional service directory, wherein each of the service directories is associated with a corresponding one of the network interfaces.

2. The service attribute management system according to claim 1, wherein the setting conditions referenced by said attribute setting section are able to be arbitrarily set.

3. The service attribute management system according to claim 1, wherein the attribute has at least one field that provides information about the location of the service section.

4. A service attribute management system for use in a distributed object system having a service section, comprising:

a service directory for storing an attribute of the service section as management information; and an attribute setting section used to determine the attribute that is to be stored in said service directory, the attribute that is to be stored being determined by the attribute setting section in accordance with predetermined setting conditions and information about said service section, wherein the setting conditions referenced by said attribute setting section are able to be arbitrarily set, and further comprising at least one additional attribute setting section, each of the attribute setting sections being associated with a corresponding one of the service directories, wherein said setting conditions referenced by the attribute setting sections are able to be set individually.

5. The service attribute management system according to claim 4, wherein the predetermined setting conditions comprise rules for assigning attributes.

6. A service attribute management system for use in a distributed object system having a service section, comprising:

a service directory for storing an attribute of the service section as management information; and an attribute setting section used to determine the attribute that is to be stored in said service directory, the attribute that is to be stored being determined by the attribute setting section in accordance with predetermined setting conditions and information about said service section, wherein the setting conditions referenced by said attribute setting section are able to be arbitrarily set, wherein the distributed object system includes a network having a plurality of sub-networks, and further comprising a plurality of network interfaces, each network interface being connected to a corresponding one of the sub-networks; and at least one additional service directory, each of the service directories being associated with a corresponding one of the network interfaces, and wherein said attribute setting section is commonly used for the service directory corresponding to each of the network interfaces, and wherein registration of attributes in said service directories is performed individually in accordance with setting conditions corresponding to said service directories stored in corresponding relationship tables.

* * * * *